United States Patent
Gordiet

(10) Patent No.: US 10,507,740 B2
(45) Date of Patent: Dec. 17, 2019

(54) CONTROL DEVICE FOR THE COMFORT EQUIPMENT OF A PASSENGER TRANSPORT VEHICLE SEAT MODULE, SEAT MODULE AND SYSTEM FOR CONTROLLING COMFORT EQUIPMENT

(71) Applicant: ZODIAC ACTUATION SYSTEMS, Auxerre (FR)

(72) Inventor: Pascal Gordiet, Saint Georges sur la Pree (FR)

(73) Assignee: ZODIAC ACTUATION SYSTEMS, Auxerre (FR)

( * ) Notice: Subject to any disclaimer, the term of this patent is extended or adjusted under 35 U.S.C. 154(b) by 266 days.

(21) Appl. No.: 15/475,369

(22) Filed: Mar. 31, 2017

(65) Prior Publication Data

US 2017/0282755 A1 Oct. 5, 2017

(30) Foreign Application Priority Data

Apr. 1, 2016 (FR) ...................... 16 52904

(51) Int. Cl.
*G05D 1/00* (2006.01)
*G05D 3/00* (2006.01)
(Continued)

(52) U.S. Cl.
CPC ......... *B60N 2/0244* (2013.01); *B60N 2/0228* (2013.01); *B60N 2/0284* (2013.01);
(Continued)

(58) Field of Classification Search
CPC ...... B60N 2/0244; B60N 2/919; B60N 2/995; B60N 2/0228; B60N 2/0284; B60N 2/16;
(Continued)

(56) References Cited

U.S. PATENT DOCUMENTS

2004/0129543 A1 7/2004 Voltz et al.
2015/0375865 A1* 12/2015 Fischer .................. B60N 2/919
701/49
(Continued)

FOREIGN PATENT DOCUMENTS

EP 1 404 542 A1 4/2004
EP 2 602-189 A1 4/2004
(Continued)

OTHER PUBLICATIONS

FR Search Report, dated Dec. 13, 2016, from corresponding FR application.

*Primary Examiner* — Mahmoud S Ismail
(74) *Attorney, Agent, or Firm* — Young & Thompson

(57) ABSTRACT

A control device for the comfort equipment of a passenger transport vehicle seat module includes a casing having a control unit and an USB port, a transmitter/receiver having an electrical plug to be plugged into the USB port, the transmitter/receiver to receive an adjusting command and to transmit the received adjusting command to the control unit, the control unit to transmit the received adjusting command to the one piece of comfort equipment. The control device further includes a locking device having a maneuvering member. When the maneuvering member is actuated, the locking device prevents the transmission of the adjusting command from the transmitter/receiver to the piece of comfort equipment.

16 Claims, 3 Drawing Sheets

(51) Int. Cl.
| | | |
|---|---|---|
| *G06F 7/00* | (2006.01) | |
| *G06F 17/00* | (2019.01) | |
| *B60N 2/02* | (2006.01) | |
| *B60N 2/62* | (2006.01) | |
| *B60N 3/06* | (2006.01) | |
| *B60N 2/16* | (2006.01) | |
| *B60N 2/22* | (2006.01) | |
| *B60Q 3/233* | (2017.01) | |
| *B60N 2/90* | (2018.01) | |
| *B64D 11/06* | (2006.01) | |
| *B60R 22/00* | (2006.01) | |
| *E05F 15/00* | (2015.01) | |
| *H04W 4/80* | (2018.01) | |
| *H04W 88/02* | (2009.01) | |

(52) U.S. Cl.
CPC ............ *B60N 2/16* (2013.01); *B60N 2/1635* (2013.01); *B60N 2/22* (2013.01); *B60N 2/62* (2013.01); *B60N 2/995* (2018.02); *B60N 3/063* (2013.01); *B60Q 3/233* (2017.02); *B64D 11/0639* (2014.12); *B60N 2002/0236* (2013.01); *B60N 2002/0264* (2013.01); *B60N 2002/952* (2018.02); *H04W 4/80* (2018.02); *H04W 88/02* (2013.01)

(58) Field of Classification Search
CPC .......... B60N 2/1635; B60N 2/22; B60N 2/62; B60N 3/063; B64D 11/06395; B64D 11/064; B64D 11/0643; B60Q 3/233
USPC ....................................................... 701/2, 49
See application file for complete search history.

(56) References Cited

U.S. PATENT DOCUMENTS

2016/0167788 A1* 6/2016 Thomaschewski .. B64D 11/064
297/344.1
2016/0329724 A1* 11/2016 Ibrahim .................. H02J 7/007

FOREIGN PATENT DOCUMENTS

FR 3 035 073 A1 10/2016
WO 03/004305 A1 1/2003

\* cited by examiner

US 10,507,740 B2

CONTROL DEVICE FOR THE COMFORT EQUIPMENT OF A PASSENGER TRANSPORT VEHICLE SEAT MODULE, SEAT MODULE AND SYSTEM FOR CONTROLLING COMFORT EQUIPMENT

CROSS-REFERENCE TO RELATED APPLICATIONS

The application claims priority of French Application No. 1652904 filed Apr. 1, 2016.

FIELD OF THE INVENTION

This invention relates to the field of passenger transport vehicle seat modules and, in particular, aircraft seat modules.

BACKGROUND OF THE INVENTION

Specifically, this invention relates to a device for controlling pieces of comfort equipment of a seat module, a seat module and a control system.

The devices for controlling the comfort equipment of a seat are currently controlled by remote controls or tablets made available to passengers. The control devices as well as their remote control are certified by an independent organization in order to guarantee the reliability of the behavior of the device and as such ensure the safety of the passengers.

It would be desirable to be able to control a device for controlling a seat using a dedicated application implemented in the portable telephone of the passenger. Indeed, controlling the device for controlling a seat using the portable telephone of the passenger would make it possible to decrease the costs of manufacturing control devices. Such a controlling would also be more convivial for the passenger.

However, the portable telephones of passengers cannot follow the mandatory certification procedures imposed by safety standards.

SUMMARY OF THE INVENTION

This invention has for purpose to allow for the use of a portable telephone or of a tablet of a passenger to control the comfort equipment of the seat while still complying with safety standards.

To this effect, the invention has for object a device for controlling a piece of comfort equipment of a passenger transport vehicle seat module, with the seat module comprising a seat and at least one piece of comfort equipment, said control device comprising:
  a control unit,
  a transmitter/receiver with a communications link with the control unit, said transmitter/receiver being intended to receive at least one adjusting command and to transmit it to the control unit;
  the control unit being able to transmit the adjusting command received to at least one piece of comfort equipment,
  a locking device comprising a maneuvering member, said locking device is able to prevent the transmission of said at least one adjusting command from the transmitter/receiver to said at least one piece of comfort equipment, when the maneuvering member is actuated.

According to particular embodiments, the control device comprises one or several of the following features:
  the control device comprises an electrical port, and wherein the transmitter/receiver comprises an electrical plug able to be plugged into the electrical port of the control device;
  the electrical port is a USB port;
  the transmitter/receiver uses a Bluetooth communications protocol;
  the control unit comprises a calculation unit and a storage unit and wherein the locking device comprises instructions stored in the storage unit, said instructions being able to be executed by the calculation unit, said instructions preventing the transmission of said at least one adjusting command from the control unit to said at least one piece of comfort equipment, when the maneuvering member is actuated;
  the locking device comprises a switch connected between the transmitter-receiver and the control unit, said switch being able to be opened, when the maneuvering member is actuated;
  the control device further comprises a control box with a communications link with the control unit, said control box being able to transmit at least one adjusting command to the control unit, and wherein the maneuvering member is arranged on said control box.

The invention has also for object a passenger transport vehicle seat module, said seat module comprising a seat that has a seat portion, a seat back and a legrest, a shell able to contain the seat and a control device according to the features mentioned above, wherein the maneuvering member is arranged on the shell of the seat module. Alternatively, the passenger transport vehicle seat module comprises at least piece of comfort equipment among an actuator for adjusting the depth of the seat portion, an actuator for adjusting the height of the seat portion, an actuator for adjusting the inclination of the seat back, an actuator for adjusting the inclination of the legrest, actuator for adjusting the inclination of the footrest, a video screen and a lighting device.

Finally, the invention relates to a system for controlling pieces of comfort equipment, said control system comprising:
  a central unit, and
  local control devices connected to the central unit by a control line, with each control device being conformed according to some features mentioned above, with the maneuvering member being arranged on the central unit.

BRIEF DESCRIPTION OF THE DRAWINGS

The invention shall be understood better when reading the following description, provided solely as an example and given in reference to the figures wherein.

DETAILED DESCRIPTION OF THE INVENTION

The invention relates to a device for controlling pieces of comfort equipment of a seat module mounted in a passenger transport vehicle such as an aircraft. Such a seat module comprises generally a shell and a seat that has a seat portion, a back, a legrest and a footrest. The shell contains the seat.

Figure 1:
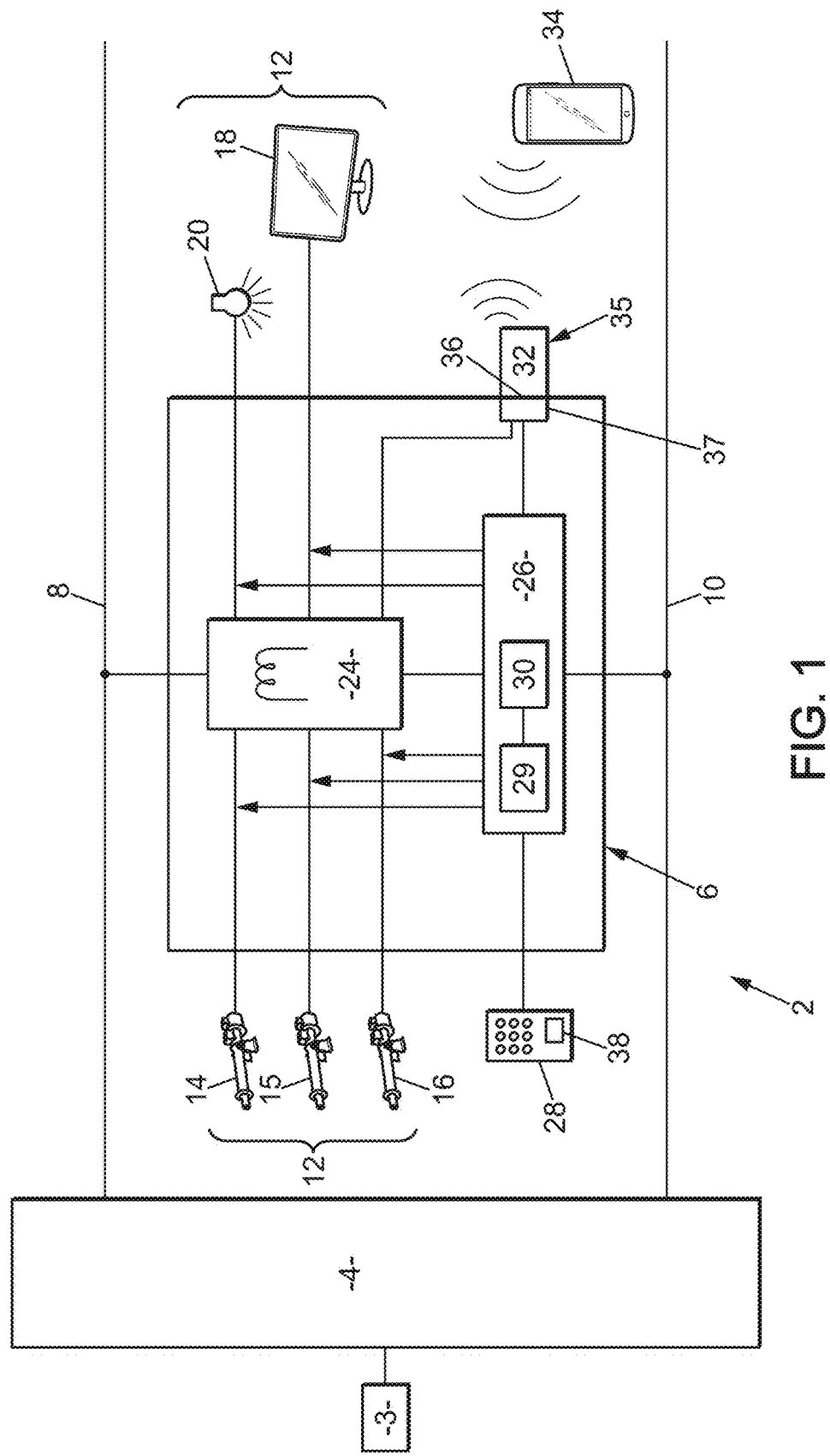
FIG. 1 is a diagrammatical view of a control system according to a first embodiment of the invention, this control system comprises a control device according to a first embodiment of the invention.

In reference to FIG. 1, the control system 2 according to a first embodiment of the invention comprises a central power source 3 generally referred to as EPDS (Electrical Power Distribution System), a central unit 4 connected in series to the power source 3 by a power line, and local control devices 6 connected in series to the central unit 4 by a power line 8 and by a control line 10.

The central unit 4 is generally referred to as MCU (Master Control Unit). It is able to deliver to the control devices 6 an alternating current of 115V at a frequency of 440 Hz. Elle is also able to transmit commands on the control line 10 intended either for all of the control devices 6 or some of them via specific addressing.

The control devices 6 are generally called ECU (Electronic Control Units). They are, for example, distributed in the first class zone or a business class zone of an aircraft. In particular, each control device 6 is arranged in the shell of a seat module. The control devices connected to the central unit are generally identical. A single control device 6 shall be described and a single control device 6 has been shown in the figures.

The control device 6 is able to control comfort equipment 12. In particular, the control device 6 is adapted to control the actuators for the displacement of certain portions of the seat of a passenger. These actuators include for example, an actuator 14 for adjusting the depth of the seat portion, an actuator 15 for adjusting the height of the seat portion, an actuator 16 for adjusting the inclination of the seatback, an actuator for adjusting the inclination of the legrest (not shown) and an actuator for adjusting a footrest (not shown).

The control device 6 can also control a video screen 18 (IFE or "In Flight Entertainment") or a lighting device 20.

The control device 6 comprises a power convertor 24 connected to the power line 8, a control unit 26 connected to the control line 10, and a control box 28 provided with a man/machine interface intended to receive commands for adjusting the comfort equipment 12.

The power convertor 24 is able to convert the alternating current into a current that is adapted to the needs of each piece of comfort equipment 12. The power convertor 24 is connected via a wired connection to the actuators 14, 15, 16, to the video screen 18, to the lighting device 20 and to the control unit 26.

The control unit 26 is able to control the actuators 14, 15, 16, the video screen 18 and the lighting device 20. The control unit 26 comprises a calculation unit 29 and a storage unit 30, also called memory, connected to the calculation unit. The control unit 26 is, for example, comprised of a processor.

The control box 28 is able to receive commands issued by the passenger and to transmit them to the control unit 26. For this purpose, the control box 28 is connected to the control unit 26 either by a wired connection or via a wireless connection.

The control box 28 is, for example, comprised of a remote control, a tablet, a personal electronic device, generally called a PDA (Passenger Electronic Device) or a keyboard mounted on a console of the seat.

The man/machine interface of the control box 28 is comprised of a keyboard and/or a screen. The passenger uses this man/machine interface to issue commands for adjusting the comfort equipment 12. These adjusting commands are, for example, to raise the seat portion, incline the seat back downwards or turn on the lighting device.

Upon receiving a command for adjusting, the control unit 26 is able to select the comfort equipment concerned by this adjusting command. Then, the control unit 26 is adapted to transmit this adjusting command to the comfort equipment 12 involved.

According to this invention, the control device 6 further comprises a transmitter/receiver 32 able to communicate wirelessly with a portable telephone 34 that belongs to a passenger.

The transmitter/receiver 32 has a communications link with the control unit 26, for example via a wired connection. The transmitter/receiver 32 is furthermore connected to the power convertor 24 in order to be supplied with electrical power.

The portable telephone 34 is provided with a dedicated application that allows the passenger to issue directly on his portable telephone the commands for adjusting the comfort equipment 12.

The transmitter/receiver 32 is able to transmit the adjusting commands that it has received from the portable telephone 34 to the control unit 26. The transmitter/receiver 32 uses, for example, the Bluetooth communications protocol.

Alternatively, the transmitter/receiver 32 uses the Wi-Fi communication protocol.

In the embodiment shown in the figures, the transmitter/receiver 32 is arranged in a removable box 35 that comprises an electrical plug 36. The control device 6 comprises an electrical port 37 wherein the electrical plug 36 is able to plug into.

Advantageously, the removable box 35 containing the transmitter/receiver 32 may or may not be plugged into the control device 6 according to the desire of the aircraft manufacturer. When the aircraft manufacturer wants to offer a service for adjusting the comfort equipment using the portable telephone of the passengers, the removable box 35 is plugged into the port 37 of the control device. When the aircraft manufacturer does not want to offer a service for adjusting the comfort equipment using the portable telephone of passengers, the removable box 35 is not plugged into the port 37.

The electrical port 37 and the electrical plug 36 are, for example, comprised of a USB port and respectively a USB plug. In this case, the box 35 can be a USB key wherein the data storage media is replaced with a transmitter/receiver. In this embodiment, the electrical port 37 is connected to the power convertor 24 in order to supply the transmitter/receiver 32 with electrical power.

According to an alternative not shown, the control device 6 does not comprise any electrical port 37. In this case, the transmitter/receiver 32 is arranged in the box of the control device 6. The transmitter/receiver 32 is connected to the control unit 26 and to the power convertor 24.

The control system 2 and the control device 6 have been tested by an independent organization. They satisfy the safety conditions established by the standards that exist in the field of aviation.

The portable telephone 34 of the passenger has not been tested by an independent organization. It does not satisfy the safety conditions issued by the existing standards in the field of aviation.

It is therefore desirable that controlling of the comfort equipment by a portable telephone 34 be able to be controlled by the on-board personnel so as to ensure the safety of the passengers.

To this effect, the control device 6 comprises a locking device comprising a maneuvering member 38. The locking device is able to prevent the transmission of adjusting commands from the transmitter/receiver 32 to the comfort equipment 12 concerned, when the maneuvering member 38 is actuated.

According to the first embodiment of the invention shown in FIG. 1, the maneuvering member 38 is arranged on the control box 28. The maneuvering member 38 is, for example, a button or a portion of a screen. The actuating of the maneuvering member 38 generates a locking command that is transmitted to the control unit 26.

The memory 30 comprises instructions according to which the control unit 26 does not take an adjusting command into account that was received after receiving a locking command. In other words, when the control unit 26 has received a locking command, the control unit 26 prevents the transmission of all of the adjusting commands to the comfort equipment 12.

Alternatively, the switch 44 is mounted on the electrical power line 50 that connects the transmitter/receiver 32 to the power convertor 24.

Alternatively, the control device 6 does not comprise a control box 28, and the commands for adjusting the comfort equipment are issued solely using the portable telephone 34.

Figure 2:
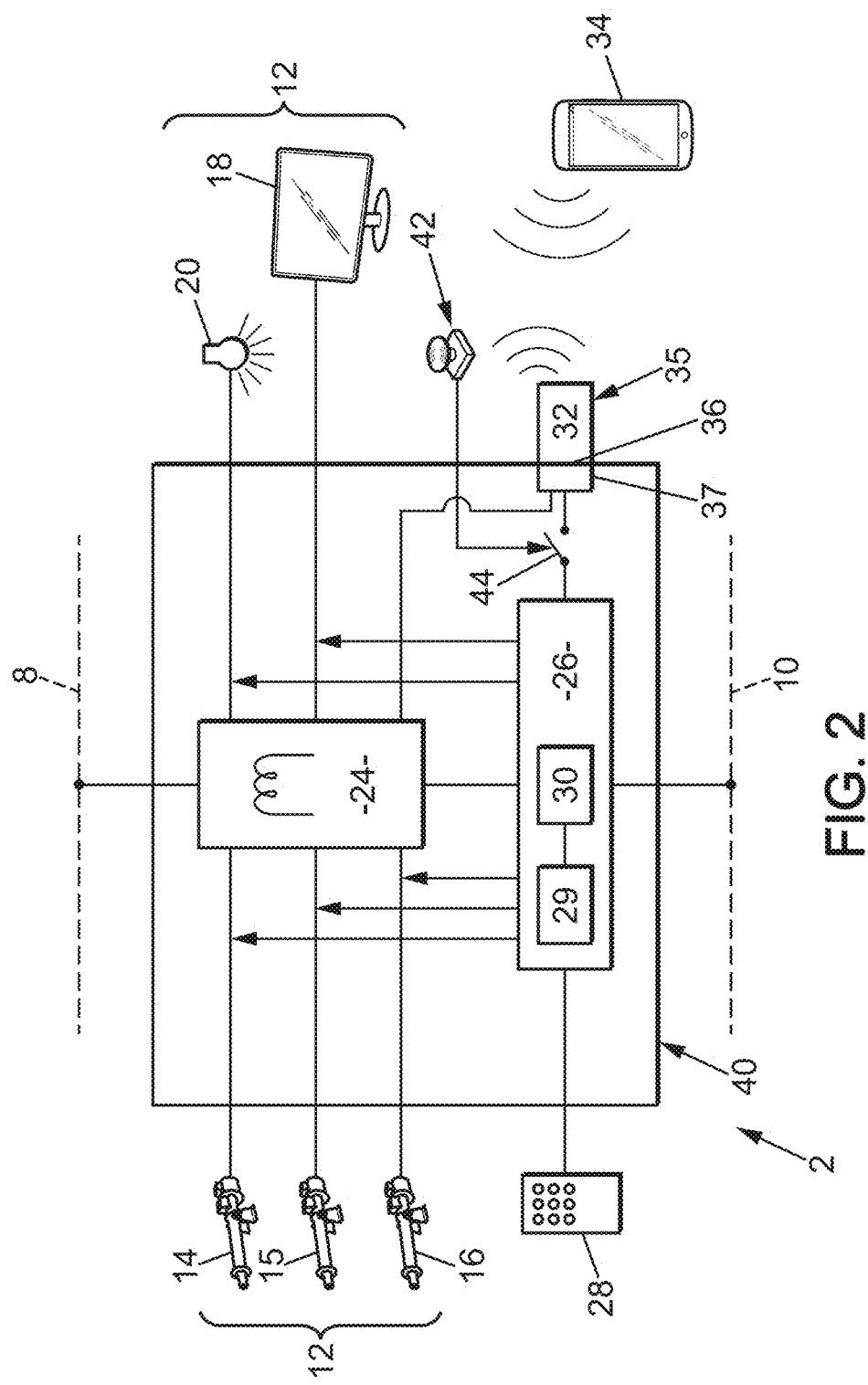
FIG. 2 is a diagrammatical view of a control device according to a second embodiment of the invention.

The control device 40 according to a second embodiment of the invention is shown in FIG. 2. The technical elements of the control device 40 according to the second embodiment of the invention are identical to the technical elements of the control device 6 according to the first embodiment shall be referenced by the same references and will not be described a second time.

The control device 40 according to the second embodiment is similar to the control device 6 according to the first embodiment except for the fact that the memory 31 does not comprise instructions making it possible to prevent the transmission of adjusting commands and due to the fact that the maneuvering member 38 is not arranged in the control box.

In reference to FIG. 2, the control device 40 comprises a switch 44 connected between the transmitter-receiver 32 and the control unit 26.

The control device 40 further comprises a maneuvering member 42 connected to the switch 44. Via manual actuating of the maneuvering member 42 by a passenger or the on-board personnel, the maneuvering member 42 transmits a locking command to the switch 44. The switch 44 is able to cut off the electrical connection between the transmitter/receiver 32 and the control unit 26 upon reception of this locking command.

The locking command member 42 is, for example, arranged on the shell of the seat module. Alternatively, the locking command member 42 is arranged on the seat.

Figure 3:
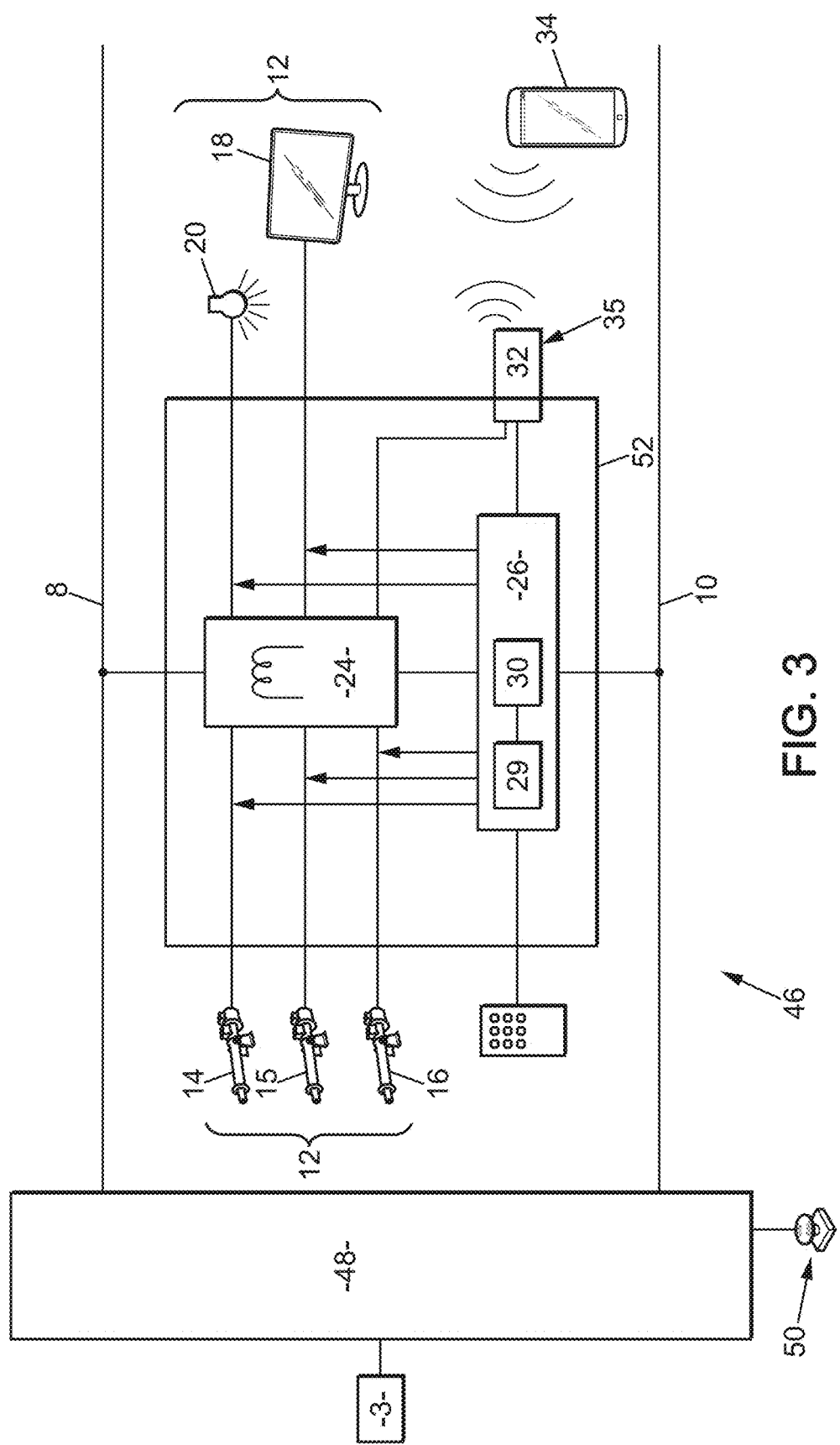
FIG. 3 is a diagrammatical view of a control system according to a second embodiment of the invention.

The control system 46 according to a second embodiment of the invention is shown in FIG. 3. The technical elements of the control system 46 according to the second embodiment of the invention identical to the technical elements of the control device 2 according to the first embodiment shall be referenced by the same references and will not be described a second time.

The control system 46 according to the second embodiment of the invention is similar to the control system 2 according to the first embodiment except for the fact that the maneuvering member 38 is not arranged in the control box 28.

In reference to FIG. 3, the control system 46 according to the second embodiment comprises a central unit 48 provided with a locking command member 50. Upon the actuating of the locking member 50 by the on-board personnel, the central unit 48 generates a locking command on the control line 10. This locking command can be sent to all the control devices 52 connected to the central unit 48.

Alternatively, this locking command can be sent to a single control device 52.

As for the first embodiment, the memory 30 of the control devices 6 comprises instructions in order to prevent the transmission of adjusting commands from the transmitter/receiver 32 to a piece of comfort equipment 12, when the control unit 26 has received a locking command coming from the central unit 10.

Advantageously, in this embodiment, the locking command can be carried out globally for a set of seats by the on-board personnel, for example during the landing and take-off phases of the aircraft.

These various embodiments can be combined together in order to increase the level of safety of the system and of the control device.

The invention claimed is:

1. A control device for comfort equipment of a passenger transport vehicle seat module, with the seat module comprising a seat and at least one piece of comfort equipment, said control device comprising:
    a casing comprising a control unit and a USB port,
    a transmitter/receiver comprising an electrical plug configured to be plugged into the USB port of the casing, said transmitter/receiver configured to receive at least one adjusting command and to transmit the received at least one adjusting command to the control unit;
    the control unit configured to transmit the received at least one adjusting command to the at least one piece of comfort equipment, and
    a locking device comprising a maneuvering member, said locking device configured, when the maneuvering member is actuated, to prevent the transmission of said at least one adjusting command from the transmitter/receiver to said at least one piece of comfort equipment.

2. The control device according to claim 1, wherein the transmitter/receiver uses a Bluetooth communications protocol.

3. The control device according to claim 1, wherein the control unit comprises a calculation unit and a storage unit and wherein the locking device comprises instructions stored in the storage unit, said instructions being executable by the calculation unit, said instructions preventing the transmission of said at least one adjusting command from the control unit to said at least one piece of comfort equipment, when the maneuvering member is actuated.

4. The control device according to claim 1, wherein the locking device comprises a switch connected between the transmitter-receiver and the control unit, said switch being able to be opened, when the maneuvering member is actuated.

5. The control device according to claim 1, wherein the control device further comprises a control box with a communications link with the control unit, said control box being able to transmit at least one adjusting command to the control unit, and wherein the maneuvering member is arranged on said control box.

6. A passenger transport vehicle seat module, said passenger transport vehicle seat module comprising said seat, said seat having a seat portion, a seat back, and a legrest, said passenger transport vehicle seat module further comprising a shell that contains the seat and the casing of the control device according to claim 1, wherein the maneuvering member is arranged on the shell of the seat module.

7. The passenger transport vehicle seat module according to claim 6, which comprises the at least piece of comfort equipment, the at least piece of comfort equipment being one of the group consisting of an actuator for adjusting the depth of the seat portion, an actuator for adjusting the height of the seat portion, an actuator for adjusting the inclination of the seat back, an actuator for adjusting the inclination of the legrest, actuator for adjusting the inclination of the footrest, a video screen and a lighting device.

8. A system for controlling comfort equipment of several passenger transport vehicle seat modules, said control system comprising:
    a central unit, and
    local control devices connected to the central unit by a control line, with each control device being conformed according to claim 1, with the maneuvering member being arranged on the central unit.

9. A passenger transport vehicle seat module, said seat module comprising a seat that has a seat portion, a seat back and a legrest, a shell able to contain the seat and the control device according to claim 2, wherein the maneuvering member is arranged on the shell of the seat module.

10. A passenger transport vehicle seat module, said seat module comprising a seat that has a seat portion, a seat back and a legrest, a shell able to contain the seat and the control device according to claim 3, wherein the maneuvering member is arranged on the shell of the seat module.

11. A passenger transport vehicle seat module, said seat module comprising a seat that has a seat portion, a seat back and a legrest, a shell able to contain the seat and the control device according to claim 4, wherein the maneuvering member is arranged on the shell of the seat module.

12. A passenger transport vehicle seat module, said seat module comprising a seat that has a seat portion, a seat back and a legrest, a shell able to contain the seat and the control device according to claim 5, wherein the maneuvering member is arranged on the shell of the seat module.

13. A system for controlling comfort equipment of several passenger transport vehicle seat modules, said control system comprising:
    a central unit, and
    local control devices connected to the central unit by a control line, with each control device being conformed according to claim 2, with the maneuvering member being arranged on the central unit.

14. A system for controlling comfort equipment of several passenger transport vehicle seat modules, said control system comprising:
    a central unit, and
    local control devices connected to the central unit by a control line, with each control device being conformed according to claim 3, with the maneuvering member being arranged on the central unit.

15. A comfort equipment control device of a passenger transport vehicle seat module, the seat module including a seat and piece of comfort equipment, said comfort equipment control device comprising:
    a casing containing a control unit and a USB port;
    a transmitter/receiver comprising an electrical plug removably insertable into the USB port of the casing,
    said transmitter/receiver configured to receive an adjusting command and to transmit the received adjusting command to the control unit,
    the control unit configured to transmit the adjusting command, received from the transmitter/receiver, to the piece of comfort equipment; and
    a locking device comprising a maneuvering member, said locking device configured, when the maneuvering member is actuated, to prevent the transmission of the adjusting command from the transmitter/receiver to the comfort equipment.

16. A passenger transport vehicle seat module, comprising:
    a seat, said seat having a seat portion, a seat back, and a legrest;
    a shell that contains the seat; and
    a comfort equipment control device located in the shell and comprising:
    i) a casing containing a control unit and a USB port;
    ii) a transmitter/receiver removably insertable into the casing, the transmitter/receiver comprising an electrical plug removably insertable into the USB port of the casing for removable insertion of the transmitter/receiver into the casing,
    said transmitter/receiver configured to receive an adjusting command and to transmit the received adjusting command to the control unit,
    the control unit configured to transmit the adjusting command, received from the transmitter/receiver, to the piece of comfort equipment; and
    iii) a locking device comprising a maneuvering member arranged on the shell of the seat module, said locking device configured, when the maneuvering member is actuated, to prevent the transmission of the adjusting command from the transmitter/receiver to the comfort equipment.

* * * * *